United States Patent
Miller

(10) Patent No.: US 10,021,859 B1
(45) Date of Patent: Jul. 17, 2018

(54) FISH KIOSK FOR WEIGHING AND TRANSMITTING FISH WEIGHT AND METHOD FOR ITS USE

(71) Applicant: Adam Miller, Destin, FL (US)

(72) Inventor: Adam Miller, Destin, FL (US)

(*) Notice: Subject to any disclaimer, the term of this patent is extended or adjusted under 35 U.S.C. 154(b) by 204 days.

(21) Appl. No.: 15/148,160

(22) Filed: May 6, 2016

(51) Int. Cl.
| | | |
|---|---|---|
| *A01K 61/10* | (2017.01) | |
| *A01K 99/00* | (2006.01) | |
| *G01G 19/60* | (2006.01) | |
| *G01G 21/28* | (2006.01) | |
| *G01B 3/02* | (2006.01) | |
| *A01K 61/00* | (2017.01) | |
| *G01G 17/00* | (2006.01) | |
| *G01G 19/415* | (2006.01) | |
| *G01G 19/52* | (2006.01) | |
| *G01B 3/10* | (2006.01) | |

(52) U.S. Cl.
CPC ............ *A01K 61/001* (2013.01); *A01K 99/00* (2013.01); *G01G 17/00* (2013.01); *G01G 19/415* (2013.01); *G01G 21/28* (2013.01); *A01K 61/10* (2017.01); *G01B 3/1084* (2013.01); *G01G 19/52* (2013.01); *G01G 19/60* (2013.01); *G01G 21/283* (2013.01)

(58) Field of Classification Search
CPC ...... A01K 61/00; A01K 61/001; A01K 61/10; A01K 97/00; A01K 99/00; G01G 17/00; G01G 19/415; G01G 19/52; G01G 19/60; G01G 21/28; G01G 21/283; G01B 3/1084

See application file for complete search history.

(56) References Cited

U.S. PATENT DOCUMENTS

| | | | |
|---|---|---|---|
| 4,328,494 A | 5/1982 | Goodall | |
| 4,465,151 A | 8/1984 | Gorman et al. | |
| 4,502,555 A | 3/1985 | Gower | |
| 4,639,872 A | 1/1987 | McHale et al. | |
| 4,753,031 A * | 6/1988 | Owen | A01K 97/00 177/245 |
| 4,839,675 A * | 6/1989 | Owen | A01K 97/00 177/245 |
| 4,969,112 A | 11/1990 | Castle | |
| 5,031,710 A | 7/1991 | Parker et al. | |
| D371,844 S * | 7/1996 | Sadritabrizi | D24/165 |
| 6,038,465 A | 3/2000 | Melton, Jr. | |
| 6,222,449 B1 * | 4/2001 | Twining | A01K 97/00 177/245 |
| 6,403,897 B1 * | 6/2002 | Bluth | A61B 5/0002 128/920 |
| 6,459,367 B1 | 10/2002 | Green et al. | |
| 6,536,599 B1 | 3/2003 | Nielsen | |
| 6,864,436 B1 | 3/2005 | Nobes et al. | |
| 7,173,197 B1 * | 2/2007 | Kasperek | A01K 97/00 177/131 |

(Continued)

*Primary Examiner* — Randy Gibson
(74) *Attorney, Agent, or Firm* — Peter Loffler

(57) ABSTRACT

A fish weight capture system accurately captures and records the number and weight of each fish caught by fishermen through a geographic area. The system uses a series of dispersed kiosks such that each kiosk weighs each fish processed by the kiosk and captures and image and other information about the fish. The data about each fish is recorded within the kiosk and is transmitted to a central computer and stored within a database. The data received from each kiosk allow a regulatory agency to determine the number and weight of each fish type taken and set appropriate rules and regulations based on this data.

20 Claims, 2 Drawing Sheets

(56) References Cited

U.S. PATENT DOCUMENTS

| | | |
|---|---|---|
| 7,193,512 B1 | 3/2007 | Coulthard |
| 7,408,125 B2 | 2/2008 | Lentine |
| 7,432,456 B2 | 10/2008 | LaFollette et al. |
| 7,673,796 B2 * | 3/2010 | Kobres ............... A47F 9/048 |
| | | 186/59 |
| 8,304,668 B2 | 11/2012 | Collins et al. |
| 8,698,014 B1 | 4/2014 | Walstad |
| 9,272,599 B1 | 3/2016 | Cook, Jr. et al. |
| 9,518,861 B2 * | 12/2016 | Aumente ............ B64F 1/366 |
| 2010/0039509 A1 | 2/2010 | Libeman |
| 2010/0185483 A1 * | 7/2010 | Collins ............. G01G 19/4144 |
| | | 177/25.15 |
| 2011/0240379 A1 * | 10/2011 | Forshaw ............. G01G 19/44 |
| | | 177/1 |
| 2012/0000713 A1 | 1/2012 | Taboada |
| 2014/0246256 A1 | 9/2014 | Stadther |
| 2015/0083805 A1 | 3/2015 | Sato et al. |
| 2015/0316409 A1 | 11/2015 | Castaneda et al. |

\* cited by examiner

FISH KIOSK FOR WEIGHING AND TRANSMITTING FISH WEIGHT AND METHOD FOR ITS USE

BACKGROUND OF THE INVENTION

1. Field of the Invention

The present invention relates to a fishing kiosk that weighs fish and transmits such information to a central database so that the amount and total weight of a particular fish caught can be tracked so that decisions on fish management can be made.

2. Background of the Prior Art

As fish stocks are a finite resource, governments in most jurisdictions implement various rules and regulations in an attempt to manage the fish stocks in order to prevent overfishing and thus depletion of the stocks. The primary focus of such fish stock management is the number of fish of a given species that is caught and kept and the weight of each such fish, this information compared against the estimated total stock of the fish. These two numbers give the management personal the information needed to properly manage the fish stock for the species. The management techniques used to manage a fish stock include providing a finite fishing season for the species so that the fish can only be caught during the season. Outside of the season, the fish stock has a chance to regenerate. Daily catch limits can also be implemented so that no one person or fishing vessel takes too much of the species in a given day. Fish size limits allow juvenile fish, fish too small to be taken, to grow and spawn, thereby helping build up the species.

Fish management techniques have helped stabilize and in some cases, such as the Gulf of Mexico red snapper, regenerate a particular fish stock so that the fish stock is at a sustainable level. The problem with modern day fish management techniques lies in the weight and numbers count of the fish being caught. The management solutions rely on various techniques to arrive at the number and weight of the fish being caught in order to generate the restrictions desired. These techniques include dock surveys where personal survey fisherman, both recreational and charter, about the fish caught. Phone surveys perform a similar function via telephone calls to fishermen, typically charter operators. Some solutions require a fisherman to keep monthly trip logs or electronic log books and transmit the entries each month to the regulatory agency. The data gathered from these gathering methods are then massaged via various statistical formulations to arrive at an estimate of the number and total weight of fish caught from which the management rules and regulations are derived.

The problems with these techniques are many. The techniques rely on self-reporting, often resulting in underestimating and thus underreporting of the fish catch, in an effort to help prevent onerous rules and regulations from being implemented. The techniques are burdensome requiring the fisherman to spend an inordinate time doing "paperwork" instead of fishing. The techniques tend to over-estimate the number and weight of fish taken, resulting in more restrictive rules and regulations than the actual facts would dictate, potentially resulting in even more underreporting going forward.

Therefore, there is a need in the art for a system whereby the number and weight of fish taken from a body of water is accurately counted and tracked so that proper rules and regulations for management of fish stocks can be implemented. Such a system should not rely on self-reporting either through a survey or through some form of log, rather the system should perform an actual number and weight count. Such a system must not unduly burden a fisherman so that he or she can spend more timing fishing and less time being burdened with various paperwork.

SUMMARY OF THE INVENTION

The fish kiosk for weighing and transmitting fish weight and method for its use of the present invention addresses the aforementioned needs in the art by providing a system wherein the actual weight of the fish is captured and thereafter transmitted to a central database so that accurate fish number and weight counts can be established and used to develop appropriate fish stock management rules and regulations. The fish kiosk for weighing and transmitting fish weight is a relatively low-cost solution to fish weight calculations, especially when compared to the man hours expended on current weight reporting techniques, with the burden on the fisherman being modest. The fish kiosk for weighing and transmitting fish weight is relatively easy to implement and use and provides highly accurate fish number and weight counts.

The fish kiosk for weighing and transmitting fish weight and method for its use of the present invention comprises a kiosk that has a view screen, a data entry subsystem, a processor with data storage, and a transmitter. A first computer system is coupled to a database and may be located remote of the kiosk. A scale is communicatively coupled to the processor such that an item (a fish) is weighed by the scale to arrive at a weight of the item. Information regarding the item is input to the processor via the data entry subsystem. The information is coupled with the weight, and the information and the coupled weight are transmitted to the first computer system wherein the information and the coupled weight is entered as data into the database. At least one camera is communicatively coupled to the processor such that the camera captures an image of the item on the scale so that the image is part of the information regarding the item. A second computer system (which can be a mobile electronic device) is provided such that the transmitter transmits the information and the coupled weight to the second computer system this second transmission acting as an electronic receipt. The data entry subsystem may be a touch sensitive overlay of the view screen. An area light may be attached to the kiosk.

BRIEF DESCRIPTION OF THE DRAWINGS

Similar reference numerals refer to similar parts throughout the several views of the drawings.

DESCRIPTION OF THE PREFERRED EMBODIMENT

Figure 1:
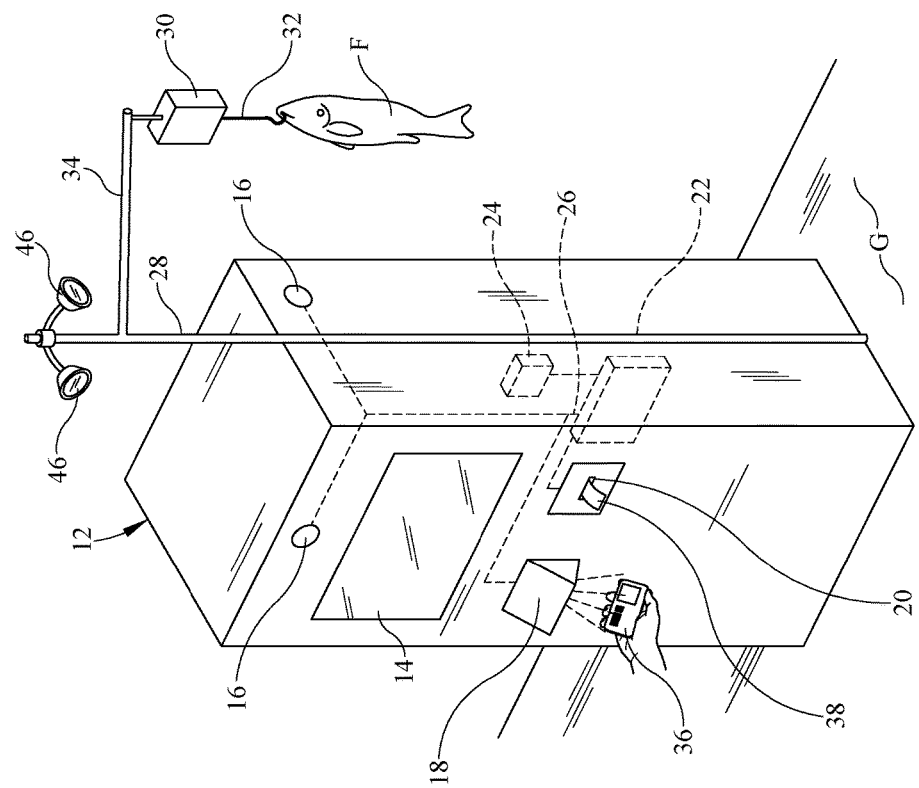
FIG. 1 is a perspective view of the fish kiosk for weighing and transmitting fish weight and method for its use of the present invention.
Figure 2:
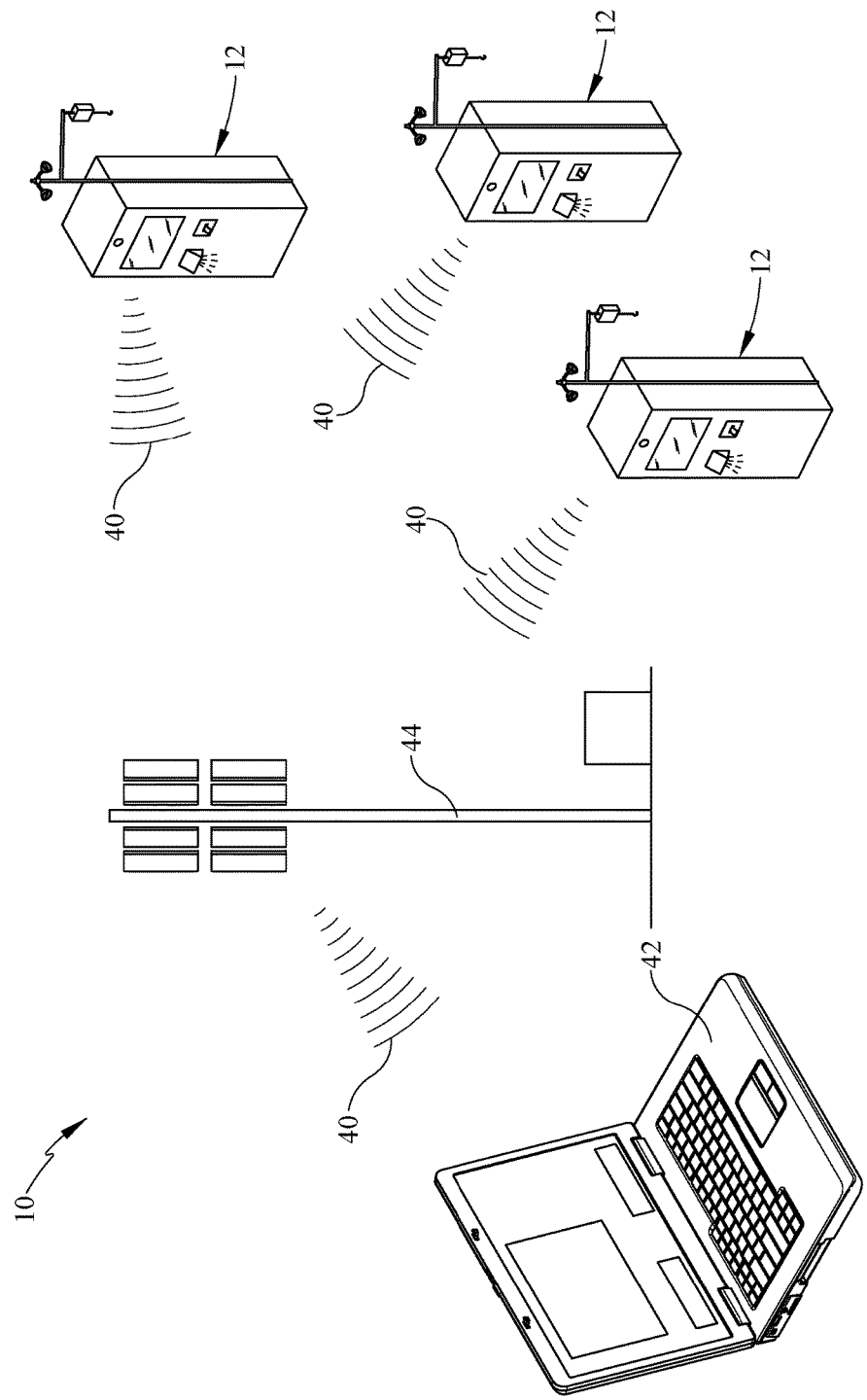
FIG. 2 is an environmental view of multiple kiosks dispersed geographically with the kiosks each in communication with a central station.

Referring now to the drawings, it is seen that the fish kiosk for weighing and transmitting fish weight and method for its use of the present invention, generally denoted by reference numeral 10, is comprised of kiosk that has a housing 12 that is secured to the ground surface G in any appropriate fashion which depends on what the ground surface comprises. As the housing 12 is exposed to the elements, the housing 12 is ideally made from an appropriate weather proof material such as ABS plastic, etc. The housing 12 has a screen 14, one or more cameras 16, a scanner 18, and a receipt slot 20. Advantageously, the screen 14 is a exterior grade touch screen so that a user can interact with the kiosk via the screen 14, however, a data entry device such as a keyboard (not illustrated) can be provided to facilitate such interaction. Disposed within the housing 12 is a processor 22 including data storage device, which can be a typical personal computer, a transmitter 24, which may also be capable of receiving, and a printer 26. The processor 22 is in communication with the transmitter 24 and the printer 26 as well as with the screen 14 and the cameras 16 and controls these items in the usual way. The housing 12 is water proofed so as to protect the various listed internal components, as well as the support components (power supply, communications buses, etc., (none illustrated)), from the elements. If desired, a flip up flexible cover (not illustrated) can be used to protect the screen 14.

Located at or near the kiosk is a pole 28 that has an exterior grade scale 30 with a hook 32 attached to an outrigger 34 of the pole 28. The pole 28 is made from stainless steel, aluminum, or similar material in order to be able to withstand exposure to the elements. The scale 30 is an appropriate fish weighing scale, such as a tension scale, and has sufficient capacity to weigh fish F of anticipated size for the area at which the kiosk is located.

In order to use the fish kiosk for weighing and transmitting fish weight 10, the kiosk is located at a desired location, such as at a marina or a boat launch, and the housing 12 is secured to the ground surface G in appropriate fashion. The kiosk is connected to a source of electrical power in appropriate fashion, depending on the particular landscape of the location whereat the kiosk is installed—if there is an electrical outlet nearby, the kiosk can simply be plugged in, if not, a dedicated electrical power cord (not illustrated) is connected between the kiosk and a source of electrical power. A user interacts with the kiosk by becoming a user in some appropriate fashion, such as right at the kiosk, through an appropriate government agency, online, etc. The user may be issued an ID card 36, although the user can simply interact with the kiosk by entering a user name and password as is well known in the art. If the ID card 36 is used, the user scans the ID card 36 via the scanner 18 (of course, the scanner 18 can be eliminated and one of the cameras 16 can be used to perform the scan of the ID card 36, or the scanner can use swipe technology) in order to initiate interaction. The ID card can be an electronic ID card such as an image on a mobile electronic device such as a cell phone. Once the user is logged into the system of the kiosk, the user places a fish F onto the hook 32 of the scale and enters the species of fish F that is being weighed. The user can manually type in the species or appropriate drop down menus can be provided. If the user is unsure of the species of fish F being weighed, appropriate help screens can be provided including photographs so that the user can match the photograph to the fish F hanging on the scale 30. For each fish F weighed by the scale 30, one of the cameras 16 captures an image of the fish F and, if need be, this image of the fish F can be input into recognition software run by the processor 22 to help the user identify the species of fish F.

Once the species of fish F is identified, the weight of the fish F as measured by the scale and the species of the fish F, as well as date and time, are all recorded by the processor 22 onto its data storage device. Each fish F captured by the fisherman is processed in similar fashion. Once the fisherman has weighed all captured fish F, then the fisherman initiates a termination of the program running on the kiosk and a receipt 38 is printed via the printer 26 and delivered to the user through the receipt slot 20. The receipt memorializes the data entered by the fisherman for proof of recording as well as to assist in the fisherman entering the data into an electronic log book if required or desired. The interactions between the user and the kiosk are via the touch sensitive screen 14 (or via the data entry device if so configured).

Of course the printer 26 and its attendant receipt slot 20 can be eliminated and the receipt sent to the fisherman electronically such as via an e-mail, a text message, an entry into the fisherman's online account, etc. Elimination of the printer 26 helps reduce servicing costs of the kiosk.

Additional functionality can be provided to the kiosk, such as asking the fisherman the location whereat each fish F was caught, the time of day the fish F was caught, etc. Additionally, the software running on the processor 22 can sync up with the fisherman's electronic log book and automatically make the entries into the electronic log book automatically.

The cameras 16 are ideally motion sensitive in order to reduce electrical consumption and reduce the amount of data captured. The cameras 16 capture not only the image of each fish F weighed by the scale 30, but also an image of the user, and possibly even of a person seeking to evade the kiosk so that when such a person walks by the kiosk, the camera 16 is activated and the person's image, including any fish the person is bearing, is recorded.

The kiosk transmits 40 the data stored by the processor 22 at regular intervals, nightly, in real time, weekly, etc., via the transmitter 24, to a central data base running on a computer system 42 located at a remote sight such as the headquarters of the regulatory agency. Of course the computer system 42 has an appropriate receiver, either directly on board or remote such as at an entry point of a network to which the computer system 42 is connected. The transmitted data is stored and massaged as desired by the regulatory agency for use it in regulatory functions. Transmission 40 of the data is performed in any appropriate fashion such as via a cellular network 44, a Wi-Fi connection, etc. Kiosks are located through the jurisdiction of the regulatory agency and each kiosk captures and reports its data in similar fashion. The transmitter 24 can also transmit diagnostic data to the computer system 42 (or other computer system, such as a technician's computer system) to report any problems, such as a faulty camera, an out of paper problem with the printer 20, etc. If the transmitter is also equipped with a receiver, the kiosk can receive input such as software updates.

One or more lights 46 can be located atop the pole 28 for help in lighting the marina, boat ramp, etc.

While the invention has been particularly shown and described with reference to an embodiment thereof, it will be appreciated by those skilled in the art that various changes in form and detail may be made without departing from the spirit and scope of the invention.

I claim:

1. A fish weight data capture system, for weighing a fish, the fish weight data capture system comprising:
   a kiosk having a view screen, a data entry subsystem, a processor with data storage, and a transmitter;
   a first computer system coupled to a database; and
   a pole mounted hook scale communicatively coupled to the processor such that the fish is adapted to be weighed by the scale to arrive at a weight of the fish and information regarding the fish is input to the processor via the data entry subsystem, the information is coupled with the weight, and the information and the coupled weight transmitted to the first computer system wherein the information and the coupled weight is entered into the database.

2. The fish weight data capture system as in claim 1 further comprising a camera communicatively coupled to the processor such that the camera captures an image of the fish on the scale so that the image is part of the information regarding the item.

3. The fish weight data capture system as in claim 2 further comprising a second computer system such that the transmitter transmits the information and the coupled weight to the second computer system.

4. The fish weight data capture system as in claim 3 wherein the data entry subsystem is a touch sensitive overlay of the view screen.

5. The fish weight capture system as in claim 4 further comprising an area light attached to the kiosk.

6. The fish weight capture system as in claim 5 further comprising a printer disposed within the kiosk such that the printer prints a receipt with the information and coupled weight printed thereon.

7. The fish weight data capture system as in claim 1 further comprising a second computer system such that the transmitter transmits the information and the coupled weight to the second computer system.

8. The fish weight data capture system as in claim 1 wherein the data entry subsystem is a touch sensitive overlay of the view screen.

9. The fish weight capture system as in claim 1 further comprising an area light attached to the kiosk.

10. The fish weight capture system as in claim 1 further comprising a printer disposed within the kiosk such that the printer prints a receipt with the information and coupled weight printed thereon.

11. A method for capturing fish weight data comprising the steps of:
providing a kiosk having a view screen, a data entry subsystem, a processor with data storage, and a transmitter;
providing a first computer system coupled to a database;
providing a pole mounted hook scale
communicatively coupling the scale to the processor;
placing a fish on the scale to arrive at a weight of the fish;
inputting information regarding the item to the processor via the data entry subsystem;
coupling the information with the weight;
having the transmitter transmit the information and the coupled weight to the first computer system; and
entering the information and the coupled weight is entered into the database.

12. The method as in claim 11 further comprising the steps of:
providing a camera;
communicatively coupling the camera to the processor;
having the camera capture an image of the fish on the scale; and
appending the information to include the image prior to transmitting the information and the coupled weight to the first computer system.

13. The method as in claim 12 further comprising the steps of:
providing a second computer system; and
having the transmitter transmit the information and the coupled weight to the second computer system.

14. The method as in claim 13 wherein the data entry subsystem is a touch sensitive overlay of the view screen.

15. The method as in claim 14 further comprising the step of attaching an area light to the kiosk.

16. The method as in claim 15 further comprising the steps of:
disposing a printer within the kiosk; and
having the printer print a receipt with the information and coupled weight printed thereon.

17. The method as in claim 11 further comprising the steps of:
providing a second computer system; and
having the transmitter transmit the information and the coupled weight to the second computer system.

18. The method as in claim 11 wherein the data entry subsystem is a touch sensitive overlay of the view screen.

19. The method as in claim 11 further comprising the step of attaching an area light to the kiosk.

20. The method as in claim 11 further comprising the steps of:
disposing a printer within the kiosk; and
having the printer print a receipt with the information and coupled weight printed thereon.

* * * * *